US012596450B2

(12) United States Patent
Chu et al.

(10) Patent No.: US 12,596,450 B2
(45) Date of Patent: Apr. 7, 2026

(54) METHOD OF CONTROLLING TOUCH SENSOR AND RELATED TOUCH SENSING CIRCUIT

(71) Applicant: NOVATEK Microelectronics Corp., Hsin-Chu (TW)

(72) Inventors: Sheng-Huang Chu, Miaoli County (TW); Yen-Cheng Cheng, Hsinchu City (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 211 days.

(21) Appl. No.: 18/402,657

(22) Filed: Jan. 2, 2024

(65) Prior Publication Data

US 2025/0216969 A1 Jul. 3, 2025

(51) Int. Cl.
*G06F 3/041* (2006.01)
*G06F 3/044* (2006.01)

(52) U.S. Cl.
CPC ...... *G06F 3/04162* (2019.05); *G06F 3/04166* (2019.05); *G06F 3/0445* (2019.05); *G06F 3/0446* (2019.05)

(58) Field of Classification Search
CPC ............. G06F 3/04162; G06F 3/04166; G06F 3/0445; G06F 3/0446
See application file for complete search history.

(56) References Cited

U.S. PATENT DOCUMENTS

| | | | | | |
|---|---|---|---|---|---|
| 11,442,573 | B2 * | 9/2022 | Lim | .................... | G06F 3/04184 |
| 11,620,018 | B2 * | 4/2023 | Yuan | ..................... | G06F 3/0441 |
| | | | | | 345/156 |
| 11,656,715 | B2 * | 5/2023 | Cho | ......................... | G09G 3/20 |
| | | | | | 345/174 |
| 11,966,533 | B2 * | 4/2024 | Bar-Ness | .............. | G06F 3/0441 |
| 12,032,773 | B2 * | 7/2024 | Cho | ......................... | G09G 3/20 |
| 12,197,678 | B2 * | 1/2025 | Yuan | ..................... | G06F 3/0418 |
| 2022/0027010 | A1 * | 1/2022 | Yuan | ..................... | G06F 3/0418 |
| 2022/0129129 | A1 * | 4/2022 | Lim | .................... | G06F 3/04162 |
| 2022/0214791 | A1 * | 7/2022 | Cho | .......................... | G09G 3/20 |
| 2022/0342526 | A1 | 10/2022 | Bar-Ness | | |
| 2023/0195260 | A1 * | 6/2023 | Yuan | ..................... | G06F 3/0442 |
| | | | | | 345/156 |
| 2023/0266842 | A1 * | 8/2023 | Cho | ....................... | G06F 3/0412 |
| | | | | | 345/174 |
| 2024/0281085 | A1 * | 8/2024 | Bar-Ness | ............ | G06F 3/04162 |

FOREIGN PATENT DOCUMENTS

| | | |
|---|---|---|
| CN | 114721539 A | 7/2022 |
| TW | 202336573 A | 9/2023 |

* cited by examiner

*Primary Examiner* — Michael Pervan
(74) *Attorney, Agent, or Firm* — Winston Hsu

(57) ABSTRACT

A method of controlling a touch sensor having a plurality of touch sensing electrodes includes steps of: outputting an uplink signal to a first touch sensing electrode among the plurality of touch sensing electrodes; and outputting an inverse uplink signal to a second touch sensing electrode among the plurality of touch sensing electrodes. The inverse uplink signal is substantially inverse to the uplink signal.

23 Claims, 10 Drawing Sheets

$$VS = VT - VB$$

$$VS = VT - VI = \text{⊓⌐} - \text{⊓⊔} = |||$$

$$VS = VT - VI = \; \text{⊓⊓} - \text{⊔⊔} = \; \text{|||}$$

$$VS=VT-VI=\ \text{Л}\ -\ \text{Ш}\ =\ \text{Ⅲ}$$

METHOD OF CONTROLLING TOUCH SENSOR AND RELATED TOUCH SENSING CIRCUIT

BACKGROUND OF THE INVENTION

1. Field of the Invention

The present invention relates to a method of controlling a touch sensor and a related touch sensing circuit, and more particularly, to a method of controlling a touch sensor and a related touch sensing circuit for a stylus.

2. Description of the Prior Art

An active stylus is a common peripheral device used for an electronic device having a touch panel, such as a mobile phone or laptop. Currently available touch panels on the market are usually equipped with both finger touch sensing and stylus control functions. The touch panel may perform bi-directional communications with an active stylus through signal transmissions when the stylus contacts or approaches the surface of the touch panel.

If a user takes a stylus to perform input on the touch panel, the signal intensity received by the stylus may be reduced due to signal coupling between the touch panel and the user's hand.

SUMMARY OF THE INVENTION

It is therefore an objective of the present invention to provide a method of enhancing the uplink signals for the stylus, in order to improve the signal intensity and solve the abovementioned problems.

An embodiment of the present invention discloses a method of controlling a touch sensing. The touch sensor has a plurality of touch sensing electrodes. The method comprises steps of: outputting an uplink signal to a first touch sensing electrode among the plurality of touch sensing electrodes; and outputting an inverse uplink signal to a second touch sensing electrode among the plurality of touch sensing electrodes. Wherein, the uplink signal toggles with a first direction, and the inverse uplink signal toggles with a second direction opposite to the first direction.

Another embodiment of the present invention discloses a touch sensing circuit for controlling a touch sensor. The touch sensor has a plurality of touch sensing electrodes. The touch sensing circuit comprises a touch front-end circuit to output an uplink signal to a first touch sensing electrode among the plurality of touch sensing electrodes, and output an inverse uplink signal to a second touch sensing electrode among the plurality of touch sensing electrodes. Wherein, the uplink signal toggles with a first direction, and the inverse uplink signal toggles with a second direction opposite to the first direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
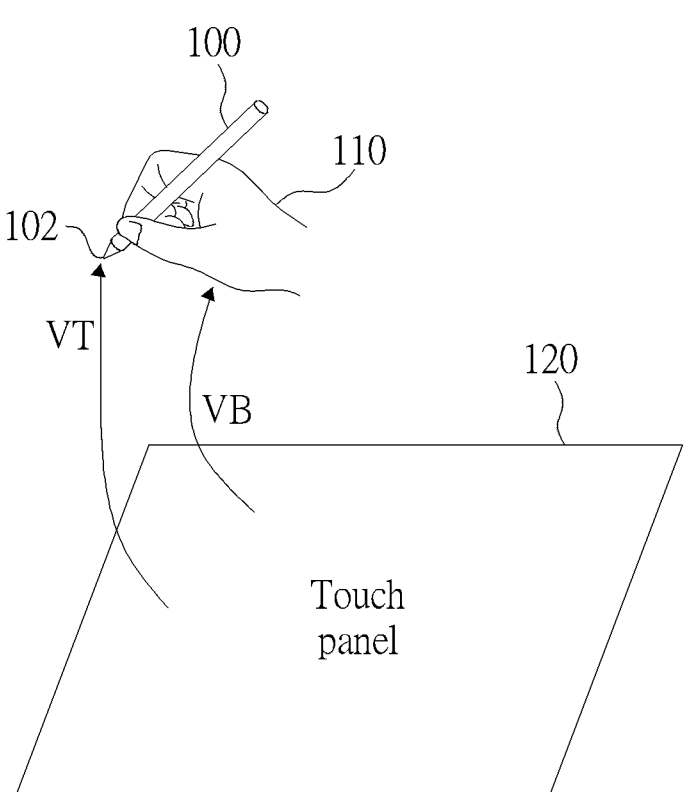
FIG. 1 illustrates the interaction of a stylus and a touch panel.

FIG. 1 illustrates the interaction of a stylus 100 and a touch panel 120. As mentioned above, the stylus 100 and the touch panel 120 may perform bi-directional communications. More specifically, the touch panel 120 may send uplink signals to the stylus 100, and the stylus 100 may send downlink signals to the touch panel 120, where the stylus 100 may be an active stylus capable of proactively outputting signals. The touch panel 120 may include a touch sensor composed of multiple touch sensing electrodes, which are capable of forwarding uplink signals to the stylus 100 and receiving downlink signals from the stylus 100. The touch panel 120 may be integrated with a display panel to realize both display and touch/stylus control functions, or may be an independent touchpad without display functions. The touch panel 120 may be controlled by a touch sensing circuit or any appropriate control circuit.

The uplink signals may carry commands that the touch sensing circuit needs to deliver to the stylus 100, to control the operations of the stylus 100. For example, an uplink command signal may notify the stylus 100 to change its operation mode or setting. Alternatively, an uplink signal may be output to search for a stylus 100 contacting or approaching the touch panel 120. After the stylus 100 receives this uplink signal, it may return a corresponding downlink signal to the touch panel 120, allowing the touch sensing circuit to determine the position of the stylus 100.

As shown in FIG. 1, the touch panel 120 needs to transmit an uplink signal VT to the stylus 100 through the touch sensing electrodes deployed on the touch panel 120, and this uplink signal VT may be received by the stylus 100 through the pen tip 102. However, due to the signal coupling between the touch panel 120 and the user's hand 110, the signal VS actually received by the stylus 100 may be smaller than the transmitted uplink signal VT. In this situation, a signal VB would be coupled to the pen body of the stylus 100 through the hand 110; hence, the actually received signal VS would become VS=VT−VB. The reduced signal intensity would decrease the performance of uplink transmissions, such as narrowing the stylus sensing range or decreasing the accuracy of stylus position detection.

As can be seen, the uplink signal VT may be delivered to the pen tip 102 to generate an effective signal component, but may be coupled to the pen body through the user's hand as a reducing component (i.e., VB). In order to improve the overall signal intensity, in an embodiment, the touch panel may output the uplink signal through a touch sensing electrode interacting with the pen tip (e.g., contacted by the pen tip or closest to the pen tip when hovering), while outputting an inverse uplink signal through another touch sensing electrode contacted by the user's hand. In such a situation, the inverse uplink signal would be coupled to the pen body through the user's hand as an enhancement of the uplink signal, so as to increase the intensity of the uplink signal actually received by the stylus.

Figure 2:
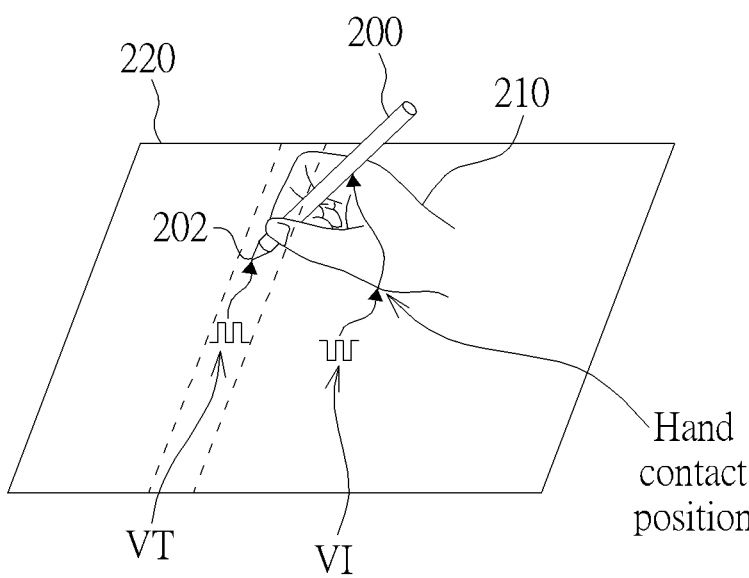
FIG. 2 is a schematic diagram of an uplink transmission scheme for a touch panel according to an embodiment of the present invention.

FIG. 2 is a schematic diagram of an uplink transmission scheme for a touch panel 220 according to an embodiment of the present invention. The touch panel 220 may interact with a stylus 200 which is held by a user's hand 210. The touch panel 220 may include a touch sensor having multiple touch sensing electrodes deployed on the touch surface of the touch panel 220. The detailed operations of the stylus 200 and the touch panel 220 are similar to those of the stylus 100 and the touch panel 120 shown in FIG. 1, and will not be repeated herein.

In this embodiment, the touch sensing electrode(s) included in an area interacting with the pen tip 202 of the stylus 200 may forward an uplink signal VT. The touch sensing electrode(s) in an area contacted by the user's hand 210 (e.g., the wrist, knuckle and/or palm) may forward an inverse uplink signal VI. In other words, a touch sensing circuit for controlling the touch sensor and the touch panel 220 may output the uplink signal VT to the touch sensing electrode(s) in the area contacted by the pen tip 202 (or closest to the pen tip 202 when hovering), and simultaneously output the inverse uplink signal VI to other touch sensing electrode(s) including the touch sensing electrode(s) contacted by the hand 210, where the inverse uplink signal VI could be a signal substantially inverse to the uplink signal VT. Therefore, the signal VS actually received by the stylus 200 will become VS=VT-VI, which is greater than the uplink signal VT transmitted by the touch panel 220.

In an embodiment, the inverse uplink signal VI may be exactly inverse to the uplink signal VT, which means that the inverse uplink signal VI and the uplink signal VT may have the same amplitude with opposite toggling directions. Alternatively, the inverse uplink signal VI and the uplink signal VT may not be two exactly inverse signals. For example, the uplink signal VT may have a first amplitude, and the inverse uplink signal VI may have a second amplitude that may be different from the first amplitude. The second amplitude may be set according to the first amplitude, so that the signal strength of the inverse uplink signal VI may be equal to a specific ratio of the signal strength of the uplink signal VT. As long as the uplink signal VT toggles with a direction while the inverse uplink signal VI toggles with another direction opposite to the direction of the uplink signal VT, the related implementations should belong to the scope of the present invention.

Figure 3:
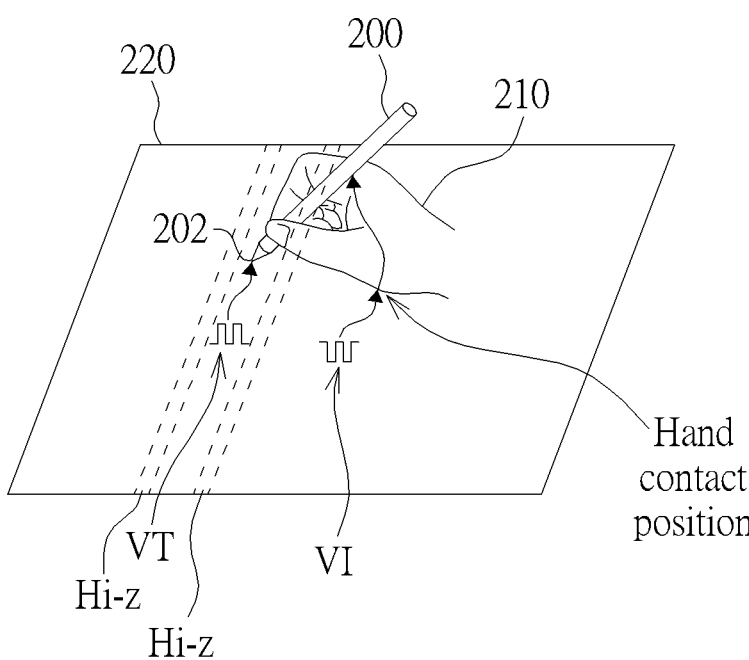
FIG. 3 is a schematic diagram of another uplink transmission scheme for the touch panel according to an embodiment of the present invention.

Note that the uplink signal VT and the inverse uplink signal VI may be applied in another manner. FIG. 3 is a schematic diagram of another uplink transmission scheme for the touch panel 220 according to an embodiment of the present invention. In this embodiment, one or more first touch sensing electrode(s) included in an area interacting with the pen tip 202 of the stylus 200 may forward the uplink signal VT. One or more second touch sensing electrode(s) in an area contacted by the user's hand 210 may forward the inverse uplink signal VI. Between the area interacting with the pen tip 202 and the area contacted by the hand 210, at least one high impedance (Hi-z) area is allocated, in which one or more third touch sensing electrode(s) are controlled to be floating, where the third touch sensing electrode(s) may be between the first touch sensing electrode(s) and the second touch sensing electrode(s).

By applying floating control in the Hi-z area, there would be no adjacent touch sensing electrodes receiving the uplink signal VT and the inverse uplink signal VI, respectively. In such a situation, the interferences between the uplink signal VT and the inverse uplink signal VI would be reduced or canceled. Note that the uplink signal VT and the inverse uplink signal VI are inverse to each other, and thus a tremendous capacitive loading may be generated if these two signals are applied to adjacent touch sensing electrodes simultaneously. The allocation of the Hi-z area could solve this problem.

In order to successfully outputting the uplink signal VT to the pen tip 202 and outputting the inverse uplink signal VI to the hand 210, a touch sensing operation may be performed to detect the position of the pen tip 202 and/or the position of the hand 210 before the uplink signal VT and the inverse uplink signal VI are output.

Figure 4:
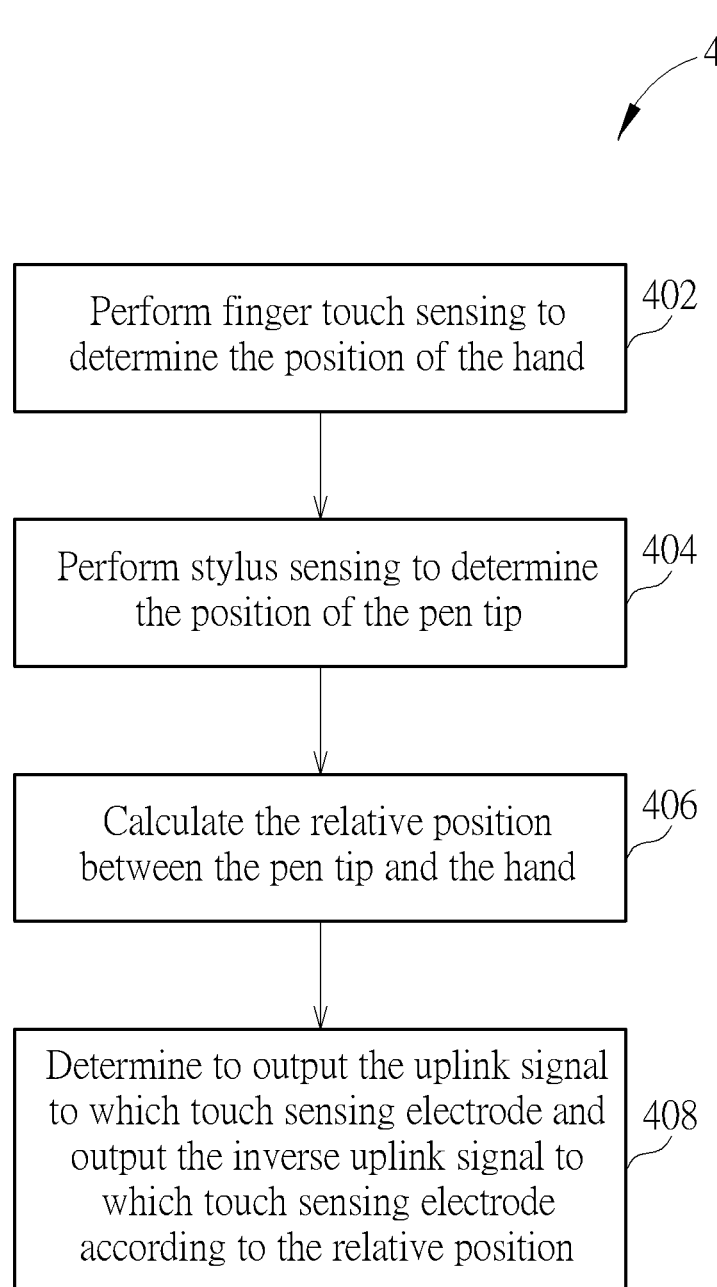
FIG. 4 is a flowchart of a process according to an embodiment of the present invention.

FIG. 4 is a flowchart of a process 40 according to an embodiment of the present invention. The process 40 may be implemented in a touch sensing circuit for controlling a touch sensor and a touch panel, which may be the touch panel 220 shown in FIG. 2 or 3. As shown in FIG. 4, the process 40 includes the following steps:

Step 402: Perform finger touch sensing to determine the position of the hand.

Step 404: Perform stylus sensing to determine the position of the pen tip.

Step 406: Calculate the relative position between the pen tip and the hand.

Step 408: Determine to output the uplink signal to which touch sensing electrode and output the inverse uplink signal to which touch sensing electrode according to the relative position.

According to the process 40, the touch sensing circuit may first perform finger touch sensing to determine the position of the hand 210 on the touch panel 220 (Step 402). More specifically, the user's hand 210 holding the stylus 200 may contact the touch panel 220 through the wrist, knuckle and/or palm, and its contact position may be detected through the finger touch operation. In addition, the touch sensing circuit may perform stylus sensing to determine the position of the pen tip 202 of the stylus 200 on the touch panel 220 (Step 404). Note that in another embodiment, the execution order of finger touch sensing and stylus sensing may be interchanged without influencing the effects. Subsequently, the touch sensing circuit may calculate the relative position between the pen tip 202 and the hand 210 (Step 406), so as to determine the settings of the touch sensing electrodes for uplink signal transmission according to the position information obtained from the touch/stylus sensing result.

Figure 5:
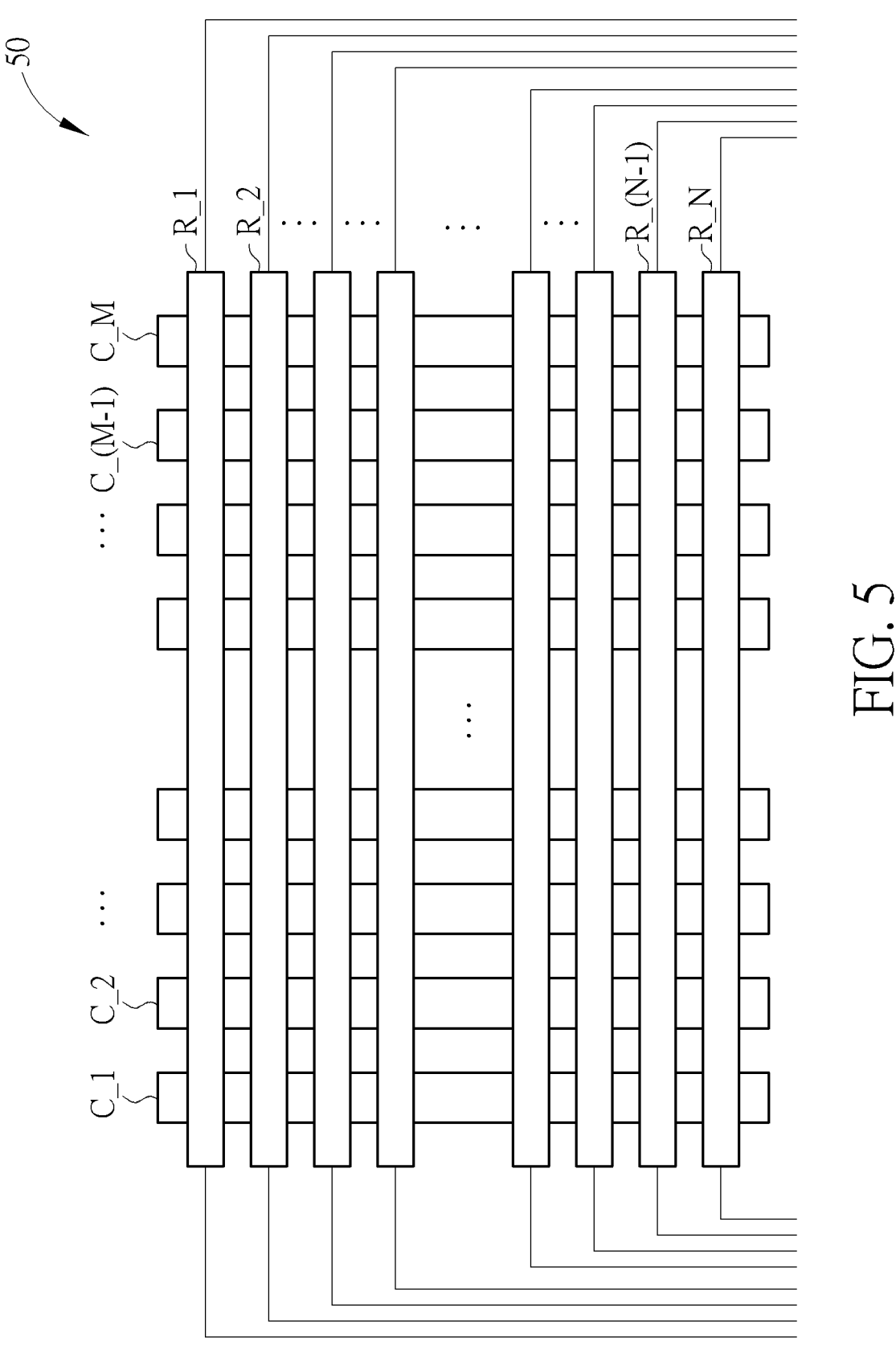
FIG. 5 is a schematic diagram of an on-cell touch sensor.

For example, in an on-cell or out-cell touch sensor, the touch sensing electrodes may be bar-type electrodes, where a plurality of row electrodes intersect a plurality of column electrodes to perform touch sensing. FIG. 5 is a schematic diagram of an on-cell touch sensor 50, which includes a plurality of row electrodes R_1-R N having a horizontal bar shape and a plurality of column electrodes C_1-C M having a vertical bar shape, where M, N may be any integer. The row electrodes R_1-R N and the column electrodes C_1-C M may be deployed in two adjacent layers, to realize mutual capacitive touch sensing.

The on-cell touch sensor 50 may have both touch sensing and stylus control functions. In the touch sensing mode, the row electrodes R_1-R N may be applied to output touch driving signals, and the column electrodes C_1-C M may be applied to receive touch sensing signals; or alternatively, the column electrodes C_1-C M may be applied to output touch driving signals, and the row electrodes R_1-R N may be applied to receive touch sensing signals. In the stylus mode, both the row electrodes R_1-R N and the column electrodes C_1-C M may be applied to communicate with the stylus. In detail, in uplink transmission periods, one or both of the row electrodes R_1-R N and the column electrodes C_1-C M may be applied to transmit the uplink signals; in downlink transmission periods, one or both of the row electrodes R_1-R N and the column electrodes C_1-C M may be applied to receive the downlink signals.

Based on the result of the finger touch and stylus sensing that may indicate the relative position of the pen tip 202 and the hand 210, the touch sensing circuit may determine to output the uplink signal VT and the inverse uplink signal VI to the row electrodes R_1-R N or the column electrodes C_1-C M. In other words, either the row electrodes R_1-R N or the column electrodes C_1-C M may be selected to be applied with the uplink signal VT and the inverse uplink signal VI.

Please note that a general on-cell touch panel may include multiple transmitter electrodes and multiple receiver electrodes, and the uplink signals are always applied to the transmitter electrodes, while the receiver electrodes can only receive downlink signals but cannot be used for forwarding the uplink signals. In comparison, the touch sensing circuit of the present invention may apply different settings on the touch sensing electrodes and/or select different touch sensing electrodes to be used for forwarding the uplink signal based on the touch sensing result, so that the pen tip and the user's hand are able to receive different uplink signals.

Figure 6:
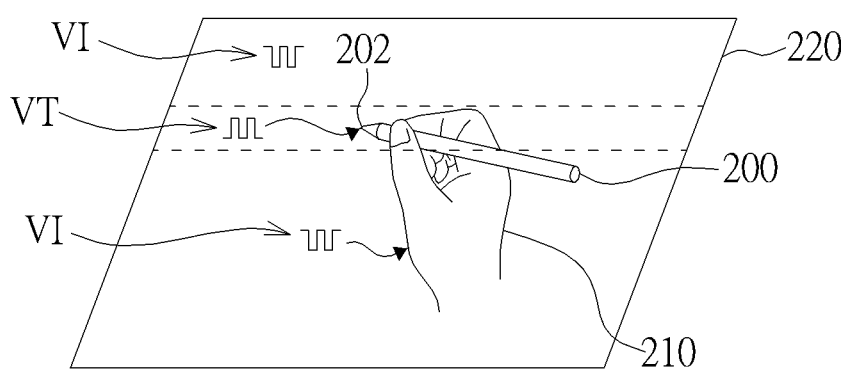
FIG. 6 and FIG. 7 illustrate that the user holds the stylus to write on the touch panel in different manners.

In an embodiment, the user may hold the stylus 200 to write or draw on the touch panel 220 in a manner as shown in FIG. 6. The touch sensing circuit may detect that the pen tip 202 is on an upper area while the hand 210 contacts the touch panel 220 on a lower area. In such a situation, the row electrodes R_1-R N may be selected, in order to effectively apply different uplink signals to the pen tip 202 and the hand 210. For example, the row electrode(s) interacting with the pen tip 202 (or additionally including several adjacent row electrodes) may be applied with the uplink signal VT, and other row electrodes including those contacted by the hand 210 may be applied with the inverse uplink signal VI.

Figure 7:
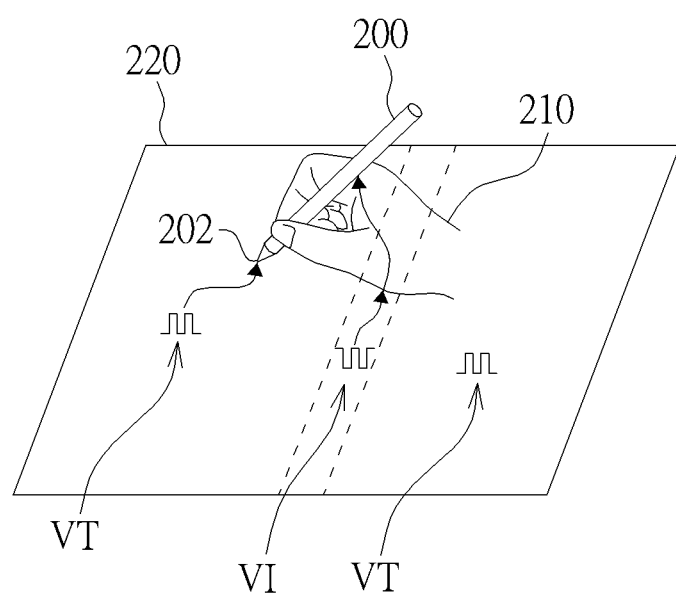

In another embodiment, the user may hold the stylus 200 to write or draw on the touch panel 220 in a manner as shown in FIG. 7. The touch sensing circuit may detect that the pen tip 202 is on a left area while the hand 210 contacts the touch panel 220 on a right area. In such a situation, the column electrodes C_1-C M may be selected, in order to effectively apply different uplink signals to the pen tip 202 and the hand 210. For example, the column electrode(s) contacted by the hand 210 (or additionally including several adjacent column electrodes) may be applied with the inverse uplink signal VI, and other column electrodes including those interacting with the pen tip 202 may be applied with the uplink signal VT.

Therefore, if the pen tip 202 and the user's hand 210 are approximately on the same horizontal line, it is preferable to apply the column electrodes C_1-C M to forward the uplink signals (including VT and VI), allowing the pen tip 202 and the hand 210 to receive different uplink signals. If the pen tip 202 and the user's hand 210 are approximately on the same vertical line, it is preferable to apply the row electrodes R_1-R N to forward the uplink signals (including VT and VI), allowing the pen tip 202 and the hand 210 to receive different uplink signals. In fact, the settings of the touch sensing electrodes may be allocated and controlled in any manner to apply the original uplink signal VT to the touch sensing electrode(s) interacting with or contacted by the pen tip 202 and simultaneously apply the inverse uplink signal VI to the touch sensing electrode(s) contacted by the user's hand 210. Other touch sensing electrodes not contacted by any object may be applied with the uplink signal VT or the inverse uplink signal VI, or may be controlled to be floating according to system requirements.

Figure 8:
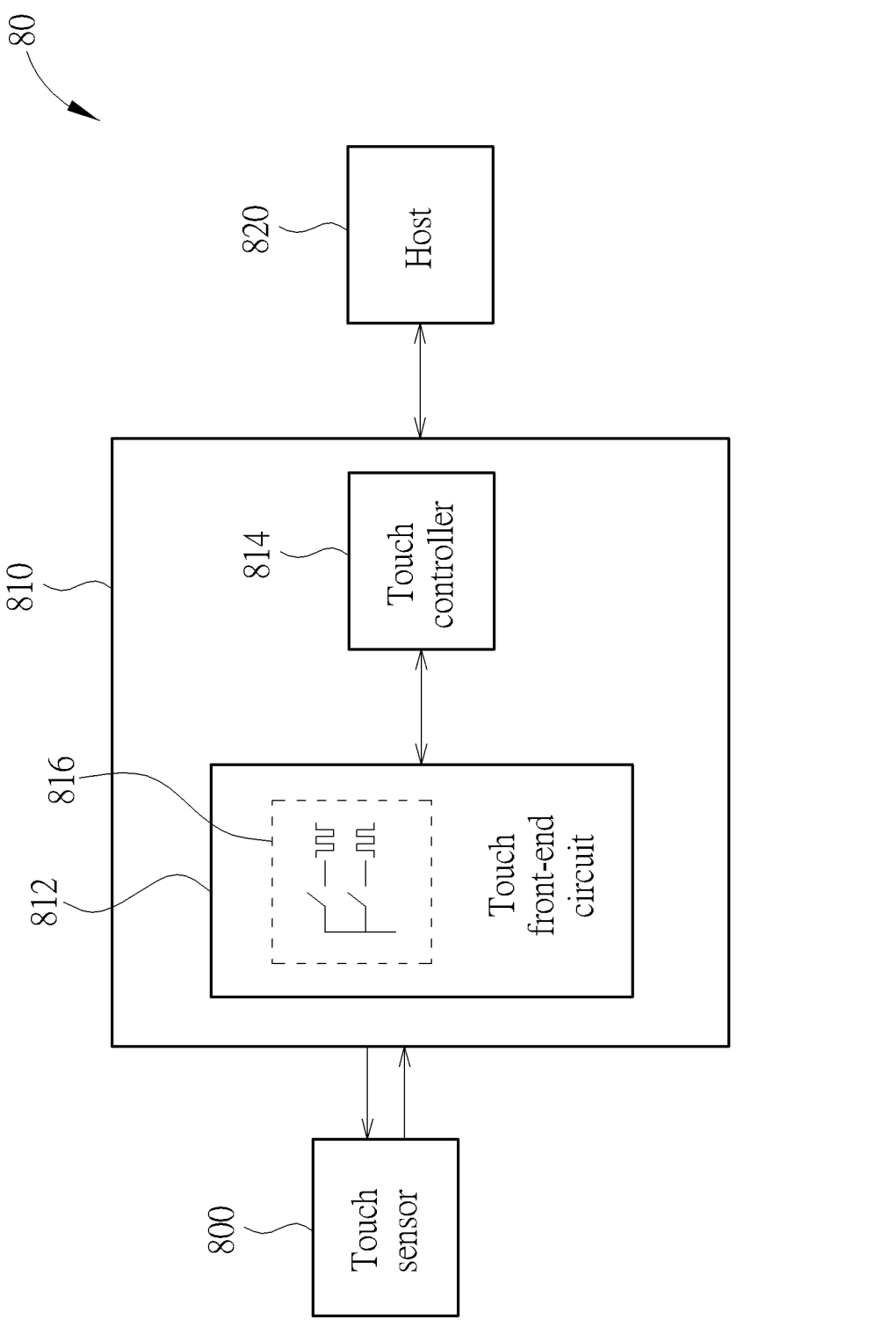
FIG. 8 is a schematic diagram of a touch control system according to an embodiment of the present invention.

FIG. 8 is a schematic diagram of a touch control system 80 according to an embodiment of the present invention. The touch control system 80 includes a touch sensor 800, a touch sensing circuit 810 and a host 820. The touch sensor 800 may be a touch sensing device implemented on a touch panel such as the touch panel 220 in the above embodiments. The touch sensor 800 may include a plurality of touch sensing electrodes deployed on the touch surface of the touch panel, where the touch sensing electrodes may include, but not limited to, the row electrodes and column electrodes as described above.

The touch sensing circuit 810 is a circuit device responsible for controlling the touch sensor 800. The touch sensing circuit 810 includes a touch front-end circuit 812 and a touch controller 814. The touch front-end circuit 812 may be an analog front-end (AFE) circuit, which may serve as an analog interface used for performing signal transmissions and receptions with the touch sensor 800. In several embodiments, the touch front-end circuit 812 may output the uplink signal and/or the inverse uplink signal to the target touch sensing electrode(s) of the touch sensor 800, so that the touch sensing electrode(s) may further forward the signals to the stylus. The downlink signals from the stylus received by the touch sensing electrode(s) may also be sent to the touch sensing circuit 810 through the touch front-end circuit 812. In several embodiments, when the touch sensor 800 performs finger touch sensing, the touch front-end circuit 812 may also process and send touch driving and sensing signals. In such a situation, the touch front-end circuit 812 may be switched to different modes to be adapted to the touch sensing and stylus control operations of the touch sensing circuit 810.

As shown in FIG. 8, the touch front-end circuit 812 may include a select circuit 816, which may provide an original uplink signal and an inverse uplink signal having different voltage swing directions. Each channel of the touch front-end circuit 812 may take the original uplink signal or the inverse uplink signal from the select circuit 816 to be output to the target touch sensing electrode(s).

The touch controller 814 may control the operations of the touch sensing circuit 810. For example, during a stylus control period, the touch controller 814 may control the touch front-end circuit 812 to output uplink signals to or receive downlink signals from one or more specific touch sensing electrodes. During a touch sensing period, the touch controller 814 may control the touch front-end circuit 812 to perform touch sensing, e.g., output a touch driving signal to the row electrodes and correspondingly receive a touch sensing signal from the column electrodes, or vice versa. In several embodiments, if the uplink signals are output based on the touch sensing result, the touch controller 814 may determine the relative position of the pen tip and the user's hand, so as to control the setting of the touch sensing electrodes and control the uplink signal transmissions of the touch front-end circuit 812. For example, based on the relative position of the pen tip and the user's hand, the touch controller 814 may determine that the uplink signal should be output to which touch sensing electrode(s) and that the inverse uplink signal should be output to which touch sensing electrode(s).

The touch controller 814 may be a core processor or controller used for handling various operations of the touch sensing circuit 810. Examples of the touch controller 814 may include, but not limited to, a digital signal processing (DSP) circuit and a microcontroller unit (MCU). In an embodiment, the touch controller 814 may include or may be coupled to a memory for storing necessary information such as the position information, and the memory is omitted in FIG. 8 for brevity.

The host 820 may be a main controller or processor of the electronic device that contains the touch sensor 800 and/or corresponding touch panel. The host 820 is equipped with sufficient computation capability to deal with more complex operations. For example, by receiving touch sensing signals from the touch controller 814, the host 820 may calculate the accurate position of the touched finger or stylus, in order to realize various functions.

Please note that the present invention aims at providing a method of enhancing the uplink signals for the stylus and a related touch sensing circuit. Those skilled in the art may make modifications and alterations accordingly. For example, the usage of the bar-type electrodes in the above embodiments is merely an example for illustrating the selections and settings of touch sensing electrodes. In another embodiment, the touch sensing electrodes may be of another shape or pattern, and the touch sensing circuit may selectively output the uplink signal and the inverse uplink signal to any appropriate touch sensing electrode(s) based on the result of touch/stylus sensing. For example, assuming that the touch sensing electrodes of the touch sensor are classified into a first set of touch sensing electrodes and a second set of touch sensing electrodes, based on the touch sensing result, the touch sensing circuit may output the uplink signal and/or the inverse uplink signal to the first set of touch sensing electrodes, or may output the uplink signal and/or the inverse uplink signal to the second set of touch sensing electrodes.

In addition, in the above embodiments, the methods of selectively outputting the uplink signal and applying the inverse uplink signal are implemented in an on-cell touch panel. In another embodiment, the methods provided in the present invention are also applicable to an in-cell touch panel. The structural comparison of the on-cell touch panel and the in-cell touch panel will be described below.

Figure 9:
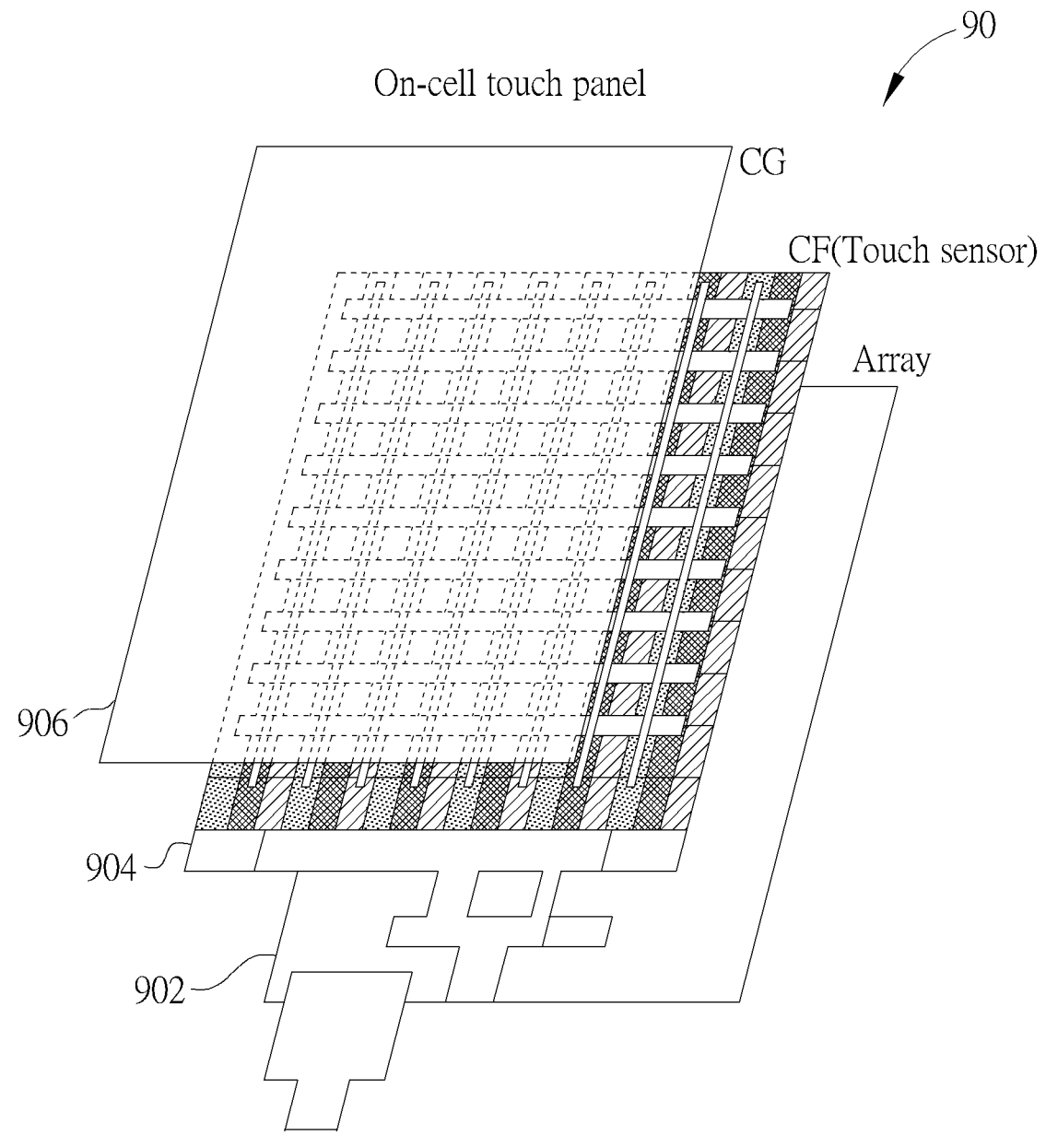
FIG. 9 is a schematic diagram of the stack-up structure of an on-cell touch panel.

FIG. 9 is a schematic diagram of the stack-up structure of an on-cell touch panel 90. The on-cell touch panel 90 includes an array 902 of display pixels. A color filter (CF) substrate 904 is stacked on the array 902, where the touch sensor may be implemented on the CF substrate 904. In an embodiment, the touch sensor may include multiple row electrodes and multiple column electrodes crisscrossing each other. A cover glass (CG) 906 is then stacked on the CF substrate 904, to protect the internal materials and provide a touch surface.

Figure 10:
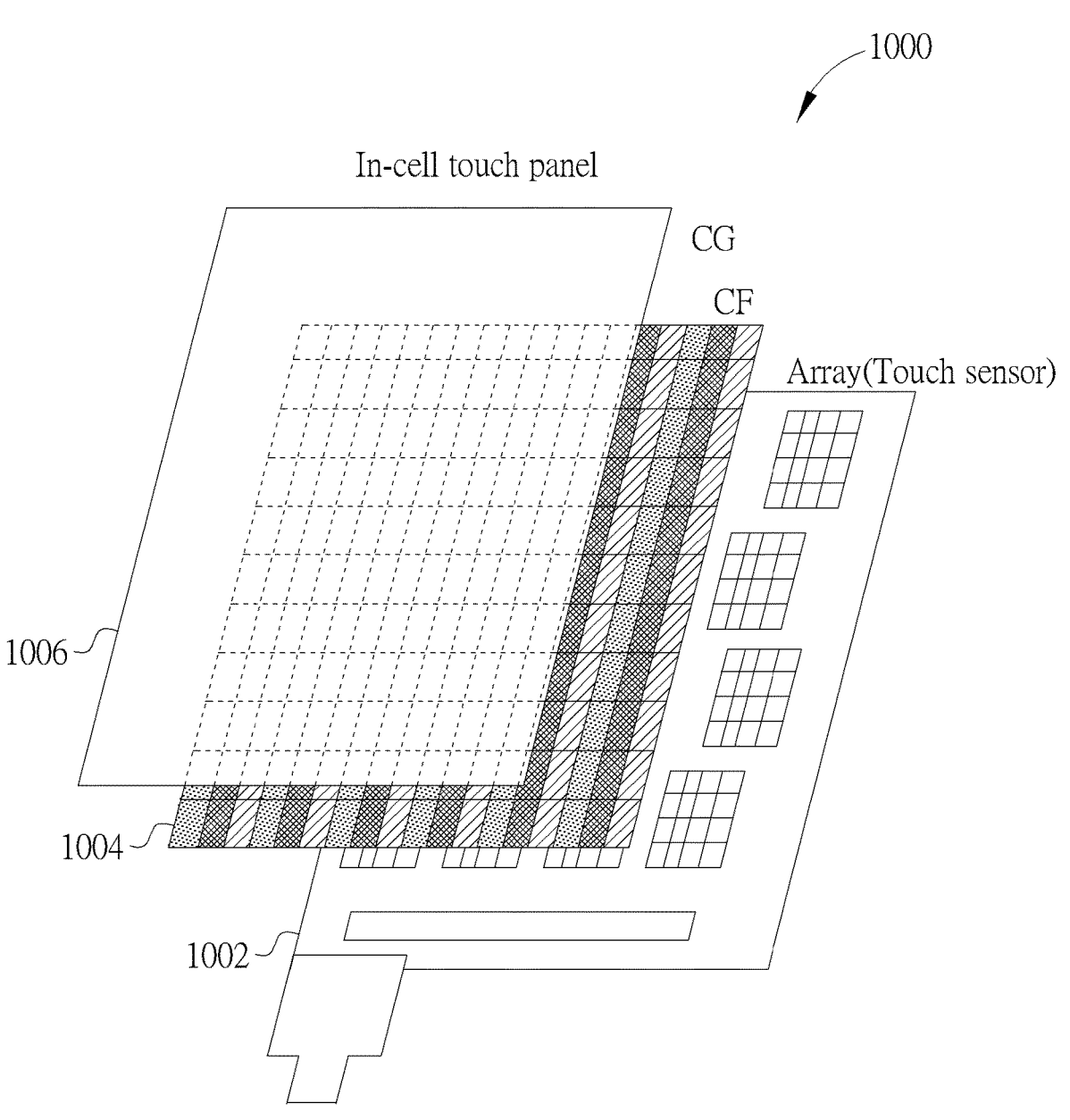
FIG. 10 is a schematic diagram of the stack-up structure of an in-cell touch panel.

FIG. 10 is a schematic diagram of the stack-up structure of an in-cell touch panel 1000. The in-cell touch panel 1000 includes an array 1002 of display pixels, which may be integrated with a touch sensor array. In an embodiment, several display pixels may be coupled together to form a touch sensing electrode. A CF substrate 1004 is stacked on the array 1002. A CG 1006 is then stacked on the CF substrate 1004, to protect the internal materials and provide a touch surface.

In the in-cell touch panel 1000, since the touch sensing electrodes are deployed as an array, the touch sensing electrodes may be merged in an appropriate manner to transmit and receive stylus control signals such as the uplink signals and the downlink signals. Therefore, based on the relative position of the pen tip and the user's hand, the touch sensing electrodes may be merged horizontally or vertically, so that the pen tip and the user's hand are able to receive different uplink signals.

To sum up, the present invention provides a method of enhancing the uplink signals for the stylus and a related touch sensing circuit. During an uplink control period for stylus, in addition to outputting the uplink signal to the touch sensing electrode(s) interacting with the pen tip, the touch sensing circuit further outputs an inverse uplink signal to the touch sensing electrode(s) contacted by the user's hand. In such a situation, the signal coupled to the pen body through the user's hand will enhance the intensity of the uplink signal. In an embodiment, a Hi-z area may be allocated between the area interacting with the pen tip and the area contacted by the hand, and the touch sensing electrodes in the Hi-z area may be controlled to be floating, so as to reduce the interferences between the uplink signal and the inverse uplink signal. In an embodiment, the uplink signals may be output based on a touch sensing result that indicates the relative position of the pen tip and the user's hand, allowing the pen tip and the hand to receive the original uplink signal and the inverse uplink signal, respectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a touch sensor, the touch sensor having a plurality of touch sensing electrodes, the method comprising:

outputting a touch driving signal to the plurality of touch sensing electrodes to perform touch sensing, to generate a touch sensing result; and outputting an uplink signal to a first touch sensing electrode among the plurality of touch sensing electrodes; and outputting an inverse uplink signal to a second touch sensing electrode among the plurality of touch sensing electrodes according to the touch sensing result;

wherein the uplink signal toggles with a first direction, and the inverse uplink signal toggles with a second direction opposite to the first direction.

2. The method of claim 1, wherein the inverse uplink signal is substantially inverse to the uplink signal.

3. The method of claim 1, wherein the uplink signal has a first amplitude, and the inverse uplink signal has a second amplitude, wherein the second amplitude is set according to the first amplitude.

4. The method of claim 1, wherein the inverse uplink signal and the uplink signal are output simultaneously.

5. The method of claim 1, further comprising:

controlling a third touch sensing electrode among the plurality of touch sensing electrodes to be floating;

wherein the third touch sensing electrode is between the first touch sensing electrode and the second touch sensing electrode.

6. The method of claim 1, further comprising:

determining a setting of the plurality of touch sensing electrodes according to the touch sensing result.

7. The method of claim 1, wherein the plurality of touch sensing electrodes comprise a first set of touch sensing electrodes and a second set of touch sensing electrodes, and the method further comprises:

determining to output the uplink signal and the inverse uplink signal to the first set of touch sensing electrodes or the second set of touch sensing electrodes according to the touch sensing result.

8. The method of claim 1, wherein the touch sensing result comprises a relative position between a pen tip and a hand.

9. The method of claim 8, wherein the plurality of touch sensing electrodes comprise a plurality of row electrodes and a plurality of column electrodes, and the method further comprises:

determining to output the uplink signal and the inverse uplink signal to the plurality of row electrodes or the plurality of column electrodes according to the relative position between the pen tip and the hand.

10. The method of claim 9, wherein the plurality of touch sensing electrodes are bar-type electrodes, each of the plurality of row electrodes have a horizontal bar shape, and each of the plurality of column electrodes have a vertical bar shape.

11. The method of claim 1, wherein the uplink signal is to be transmitted to a stylus.

12. A touch sensing circuit for controlling a touch sensor, the touch sensor having a plurality of touch sensing electrodes, the touch sensing circuit comprising a touch front-end circuit to:

output a touch driving signal to the plurality of touch sensing electrodes to perform touch sensing, to generate a touch sensing result; and output an uplink signal to a first touch sensing electrode among the plurality of touch sensing electrodes; and output an inverse uplink signal to a second touch sensing electrode among the plurality of touch sensing electrodes according to the touch sensing result;

wherein the uplink signal toggles with a first direction, and the inverse uplink signal toggles with a second direction opposite to the first direction.

13. The touch sensing circuit of claim 12, wherein the inverse uplink signal is substantially inverse to the uplink signal.

14. The touch sensing circuit of claim 12, wherein the uplink signal has a first amplitude, and the inverse uplink signal has a second amplitude, wherein the second amplitude is set according to the first amplitude.

15. The touch sensing circuit of claim 12, wherein the touch front-end circuit outputs the inverse uplink signal and the uplink signal simultaneously.

16. The touch sensing circuit of claim 12, wherein the touch front-end circuit further controls a third touch sensing electrode among the plurality of touch sensing electrodes to be floating;

wherein the third touch sensing electrode is between the first touch sensing electrode and the second touch sensing electrode.

17. The touch sensing circuit of claim 12, further comprising a touch controller, to perform touch sensing by controlling the touch front-end circuit to output the touch driving signal to the plurality of touch sensing electrodes before outputting the uplink signal and the inverse uplink signal.

18. The touch sensing circuit of claim 17, wherein the touch controller further determines a setting of the plurality of touch sensing electrodes according to the touch sensing result.

19. The touch sensing circuit of claim 17, wherein the plurality of touch sensing electrodes comprise a first set of touch sensing electrodes and a second set of touch sensing electrodes, and the touch controller further determines to output the uplink signal and the inverse uplink signal to the first set of touch sensing electrodes or the second set of touch sensing electrodes according to the touch sensing result.

20. The touch sensing circuit of claim 17, wherein the touch sensing result comprises a relative position between a pen tip and a hand.

21. The touch sensing circuit of claim 20, wherein the plurality of touch sensing electrodes comprise a plurality of row electrodes and a plurality of column electrodes, and the touch controller further determines to output the uplink signal and the inverse uplink signal to the plurality of row electrodes or the plurality of column electrodes according to the relative position between the pen tip and the hand.

22. The touch sensing circuit of claim 21, wherein the plurality of touch sensing electrodes are bar-type electrodes, each of the plurality of row electrodes have a horizontal bar shape, and each of the plurality of column electrodes have a vertical bar shape.

23. The touch sensing circuit of claim 12, wherein the uplink signal is to be transmitted to a stylus.

\* \* \* \* \*